United States Patent [19]
Ling et al.

[11] Patent Number: 5,936,024
[45] Date of Patent: Aug. 10, 1999

[54] METHODS AND COMPOSITIONS FOR TREATING STICKIES

[75] Inventors: Tien-Feng Ling, Jacksonville, Fla.; William F. Scholz, Scottsdale, Ariz.

[73] Assignee: BetzDearborn Inc., Trevose, Pa.

[21] Appl. No.: 08/870,780

[22] Filed: Jun. 6, 1997

[51] Int. Cl.[6] .................................................. C08K 5/01
[52] U.S. Cl. ..................... 524/474; 524/476; 524/481; 524/483; 524/490; 162/199
[58] Field of Search ................................. 524/509, 474, 524/476, 481, 483, 490; 162/199

[56] References Cited

U.S. PATENT DOCUMENTS

| | | | |
|---|---|---|---|
| 4,643,800 | 2/1987 | Maloney et al. | 162/5 |
| 4,698,133 | 10/1987 | Moreland | 162/5 |
| 4,781,794 | 11/1988 | Moreland | 162/199 |
| 4,822,452 | 4/1989 | Tse et al. | 162/146 |
| 4,886,575 | 12/1989 | Moreland | 162/5 |
| 4,923,566 | 5/1990 | Shawki et al. | 162/135 |
| 4,995,944 | 2/1991 | Aston et al. | 162/199 |
| 5,080,759 | 1/1992 | Buzby et al. | 162/158 |
| 5,213,661 | 5/1993 | Naddeo et al. | 162/6 |
| 5,266,166 | 11/1993 | Dreisbach et al. | 162/199 |
| 5,292,403 | 3/1994 | Dreisbach et al. | 162/158 |
| 5,300,194 | 4/1994 | Welkener et al. | |
| 5,368,694 | 11/1994 | Rohlf et al. | |
| 5,415,739 | 5/1995 | Furman, Jr. et al. | |
| 5,618,861 | 4/1997 | Hlivka et al. | |

OTHER PUBLICATIONS

"Additives to Combat Sticky Contaminants in Secondary Fibers", M. R. Doshi, Tappi Recycling Paper: from Fiber to Finished Product, p. 519, 1991.

"Cost–Effective, Common Sense Approach to Stickies Control", T. Fogarty, Tappi J., vol. 76, No. 3, Mar., 1993.

*Primary Examiner*—Edward J. Cain
*Attorney, Agent, or Firm*—Philip H. Von Neida

[57] ABSTRACT

The present invention provides for methods and compositions for removing stickies and pitch from papermaking fiber by first chemically treating the papermaking fiber with a composition of at least two of an oil-soluble or water-dispersible hydrophobic polymer, an oil soluble or water-dispersible surfactant having an HLB of about 1 to about 10, a tackifier, and an oil soluble or water-dispersible solvent then mechanically separating the agglomerated stickies and pitch from the papermaking fiber.

32 Claims, No Drawings

METHODS AND COMPOSITIONS FOR TREATING STICKIES

FIELD OF THE INVENTION

The present invention relates to methods and compositions for removing stickies and pitch from papermaking fiber by a chemically enhanced mechanical separation process.

BACKGROUND OF THE INVENTION

In recent years, there has been an increasing use of recycled fibers in the paper industry due to environmental concerns, government legislation, economic considerations, and the market demand for paper containing recycled fiber. Since stickies contaminants are present in varying amounts in recycled paper, they often cause special problems at various stages of the papermaking process. These problems often include:
1) increased machine downtime due to breaks and required clean-up
2) reduced product quality due to picking, pinholes, and poor appearance
3) increased replacement costs for wires and felts
4) reduced converting and/or printing process efficiency
5) limited levels of fiber substitution
6) repulping difficulty Stickies are generally a diverse mixture of polymeric organic materials which can stick on wires, felts or other parts of paper machines, or show on the sheet as "dirt spots". The sources of stickies may be pressure-sensitive adhesives, hot melts, waxes, latexes, binders for coatings, wet strength resins, or any of a multitude of additives that might be contained in recycled paper. The term "pitch" normally refers to deposits composed of organic compounds which are derived from natural wood extractives, their salts, coating binders, sizing agents, and defoaming chemicals existing in the pulp. Although there are some discrete characteristics, there are common characteristics between stickies and pitch, such as hydrophobicity, low surface energy, deformability, tackiness, and the potential to cause problems with deposition, quality, and efficiency in the process.

For the increased mandatory use of recycled fiber in the pulp and paper industry, co-occurrence of stickies and pitch problems are often observed. The materials of this invention have shown their ability to remove stickies from fiber furnish via agglomeration mechanisms and mechanical separation processes. It is believed that these materials can also be used for pitch agglomeration and pitch removal from the fiber furnish.

Several non-chemical approaches have been used in the paper industry to combat stickies. These approaches include furnish selection, screening, cleaning, and thermal/mechanical dispersion such as dispergers or kneaders. However, each of these approaches has limitations. Furnish selection may reduce but not completely eliminate the stickies' contaminants in the system, while it will significantly increase the furnish cost. Furthermore, paper companies will also tend to utilize lower grade furnishes to reduce raw material costs. Subsequently, even more contaminants are introduced into the papermaking system.

Stickies cannot be completely removed with screening equipment since minimum slot size is limited to 150 microns for throughput reasons. Finer screen may also cause a high level fiber loss with contaminants removal. Reverse and forward cleaning may not be effective for removing stickies due to the small density differences between stickies and water. Thermal/mechanical dispersion units can enhance the breakup of stickies, but cannot prevent the agglomeration downstream where problems usually occur. In addition, this approach requires capital investment costs and energy expenditure.

Chemical treatment techniques for controlling stickies and pitch include dispersion/emulsification, detackification, wire passivation, and cationic fixation. Chemical treatments include mineral additives, alum, polyphosphates, emulsifiers, dispersants, water-soluble polymers, and combinations thereof.

Typically, these agents are fed to the pulper, stock storage chest and/or applied to the process equipment surfaces where depositions occurred. These surfaces include paper machine foils, paper machine wires, wet press felts, dryer felts, Uhle boxes and calendar stacks.

SUMMARY OF THE INVENTION

The present invention is directed towards stickies and pitch removal by chemically enhanced mechanical separation processes. The stickies and pitch contained in the papermaking fiber are first treated chemically and removed subsequently through a mechanical separation process.

The chemicals employed in the present invention are either oil soluble or water dispersible. These chemicals include at least two of an oil soluble or water-dispersible polymer, an oil soluble or water-dispersible surfactant having an HLB of about 1 to about 10, a tackifier, and an oil soluble or water-dispersible solvent.

DESCRIPTION OF THE RELATED ART

A number of chemicals have traditionally been used to treat stickies. Representative examples include a methyl cellulose derivative, a methyl ether cellulose derivative, polyvinyl alcohol and urea. M. R. Doshi in "Additives to Combat Sticky Contaminants in Secondary Fibers", Tappi Recycling Paper: From Fiber to Finished Product, p. 519, 1991, discusses five different additives for controlling stickies. These additives include talc, solvents and dispersants, synthetic fibers, zirconium compounds and sequestering agents for excess alum. "Cost-Effective, Common Sense Approach to Stickies Control", T. J. Fogarty, Tappi J., Vol. 76, No. 3, March 1993, provides an overview addressing control methods such as dispersion, detackification, cationic fixation, wire passivation, and solvents to control stickies in recycled fiber.

All of these approaches will allow the stickies to either attach to the fiber surfaces or remain in the papermaking water system. For the stickies adhered to the fiber surfaces, they will eventually contaminate the system when the fiber is recycled. Stickies remaining in the water system will cause problems later due to re-agglomeration, deposition, etc., especially for a closed loop system. In comparison, the present invention is able to make stickies agglomerates, which are not attached to the fiber surfaces, and completely remove them from the papermaking system.

DETAILED DESCRIPTION OF THE INVENTION

The present invention relates to methods and compositions for removing stickies and pitch from papermaking fiber comprising the steps of adding to the papermaking fiber in the pulper or stock storage chest a composition comprising at least two of an oil soluble or water-dispersible hydrophobic polymer, an oil soluble or water-dispersible surfactant having an HLB of about 1 to about 10, a tackifier, and an oil soluble or water-dispersible solvent, wherein the composition will cause the agglomeration of stickies and pitch, and a mechanical separation of the stickies and pitch from the papermaking fiber.

The present inventor has discovered that the inventive two-step approach will remove agglomerated stickies and pitch from the recycled fiber stock. Downstream of the mechanical separation stage, the stock contains few stickies. This will allow for less expensive processing as other chemical treatments are not needed to eliminate the detrimental effects of the stickies and pitch deposits.

The oil soluble or water-dispersible hydrophobic polymers that are useful in the present invention are selected primarily for their hydrophobicity and, in some measure, their ability to provide tackiness to stickies and pitch in the aqueous phase. Examples of these polymers include, but are not limited to, phenol formaldehyde resin having a molecular weight of about 300 to about 1750, preferably the molecular weight is about 300, available as Cardolite NC-511 from Cardolite.

The hydrophobic polymers useful in this invention further include but are not limited to mixtures of tackified styrene-isoprene-styrene and styrene-butadiene based rubbers. These mixtures comprise by weight from about 11 to about 28% styrene-isoprene-styrene rubber having a molecular weight of about 135,000 and from about 11 to about 28% styrene-butadiene rubber, and from about 58 to 68 percent resin tackifiers. Typically the weight ratio of styrene-isoprene-styrene rubber to styrene-butadiene rubber is less than or equal to 1. The total amount of rubbers range from about 32 to 42 percent. The tackifiers comprise hydrocarbon resins, such as a low molecular weight aliphatic or aromatic hydrocarbon, a rosin-based resin tackifier, and a polyethylene polyester resin. This mixture is available from Avery Dennison as Avery Dennison AE-3610.

Other oil soluble or water-dispersible polymers useful in the methods of the present invention include, but are not limited to, alkylated vinyl pyrrolidone polymers having molecular weights from about 7300 to about 8600 and are available from ISP as Ganex V-220 and Ganex V-216; polymethacrylate available as Acryloid 966 from Rohm & Haas; and hydroxy terminated 1,3-butadiene homopolymer available from Elf Atochem as Polybd R-45HT resin; perfluoroalkyl polymers having molecular weight from about 2300 to about 4300 available as Lodyne SP-101A and Lodyne SP-35A available from Ciba-Geigy.

The oil soluble or water-dispersible surfactants have HLB from about 1 to about 10. The surfactants useful in the present invention include but are not limited to ethylene oxide (EO)-propylene oxide (PO) block copolymers having an HLB of about 1 and a molecular weight of about 3800 and an HLB of about 4 and a molecular weight of about 5000 available from BASF as Pluronic L-101 and Pluronic L-122 respectively; $C_{12}$ to $C_{14}$ alcohol ethoxylate having an HLB of about 6 and $C_{12}$ to $C_{16}$ alcohol ethoxylate having an HLB of about 4.4, both available from Vista Chemical respectively as Alfonic 1214 GC-2 and Alfonic 1216-22; and $C_{11}$ to $C_{15}$ secondary alcohol ethoxylate having HLB of about 8 and available as Tergitol 15-S-3 from Union Carbide.

Other suitable surfactants include but are not limited to ethoxylated propoxylated fatty acids having HLB's from about 3 to about 4.5 and molecular weights of about 1300 to about 1400. This compound is available commercially as Pegol L31 Ditallate from Rhone-Poulenc; coconut diethanolamide having a molecular weight of about 200 to about 350 from Witco as Varamide A2; and alkyl phenol ethoxylate having an HLB of about 4.6 available as Igepal CO-210 from Rhone-Poulenc. The present inventor anticipates that alcohol ethoxylates having from about $C_8$ to about $C_{22}$ will also be effective in the methods of the present invention.

The oil soluble or water-dispersible resin tackifiers useful in the methods of the present invention include but are not limited to rosin based resin having a softening point of about 80 to about 86° C. available as Zonester 85 and terpene based resins having a softening point of about 22 to about 118° C. available as Zonarez ALPHA 25, Zonarez 7115 and Zonarez B-115 from Arizona Chemical.

The oil soluble or water-dispersible solvents that are useful in the present invention are aliphatic hydrocarbons which include but are not limited to 1-methyl-4-isopropenyl-1-cyclohexene having a molecular weight of about 135 and available from TR-Metro as d-limonene; aliphatic hydrocarbons having molecular weights of about 120 to about 180 available as 140 solvent from Ashland; toluene; decyl alcohol available as Epal 10 from Ethyl Corp.; n-methyl-2-pyrrolidone available as NMP from ARCO and triethylene glycol.

Other suitable solvents include but are not limited to polybutene having a molecular weight of about 350 to about 500 available from AMOCO as Indopol L-14; terpene dimer having a molecular weight of about 270 available as Acintene SDO-ACP from Arizona Chemical; and an epoxidized soybean oil having a molecular weight of about 1000 available from C. P. Hall Company as Plasthall ESO.

For purposes of the present invention, the phrase "at least two of" refers to a composition comprising a polymer and a solvent; a polymer and a surfactant; a polymer and a tackifier; a solvent and a surfactant; or a polymer, a tackifier, a solvent, and a surfactant; or any combinations thereof. The terms polymer, solvent, tackifier and surfactant may include one or more of the designated class of compounds.

The compositions of the present invention are generally employed in a weight ratio of 1:9 to 9:1. As such, when two components are present, their weight ratio will range from about 1:9 to 9:1. When three components are present, the weight ratios of one will range from about 1:9 to 9:1 to each of the other two components, and so on for four components when they are all present in the composition.

The compositions of the present invention may be added to the pulper or the stock chest in an amount ranging from about 5 parts per million parts oven dry (O.D.) fiber to about 10,000 parts per million parts O.D. fiber. Preferably, from about 50 to about 5,000 parts are added per million part O.D. fiber. The effective amount of the composition to be added depends on a number of variables including the pH of the system, hardness of the water, temperature of the water; additional additives, consistency of furnish, and quantity and type of stickies and pitch in the furnish.

The compositions of the present invention may be compatible with other pulp and papermaking additives. These include starches, titanium dioxide, defoamers, wet strength resins, sizing aids and biocides.

The compositions of the present invention are effective at temperatures ranging from room temperature (≈75° F.) to about 180° F. These compositions are effective at a pH range of about 3 to about 12.

The mechanical separation of the agglomerated stickies and pitch follows the chemical treatment. This mechanical separation lies between the pulper or the stock storage chest and the headbox. These mechanical separation processes are performed with one or more of primary, secondary and tertiary screens; forward, reverse, and throwhrow cleaners; flotation devices; and centrifugal devices.

The use of slotted screens is preferred in the methods of the present invention. Typically, mills employ a fine screen of 0.006 inch (152 micron) to 0.012 inch (305 micron) slots. These finer diameter screens sometimes are problematic as their screening capacity sacrifices throughput. The method of the present invention allow mill personnel to employ a larger diameter screen to capture the agglomerated stickies and pitch particles without sacrificing throughput.

The data set forth below were developed to demonstrate the unexpected results occasioned by use of the present invention. The following examples are included as being illustrations of the invention and should not be construed as limiting the scope thereof.

TABLE I

| Formulation | Component #1 | Component #2 | Component #3 |
|---|---|---|---|
| 1 | 1-Methyl-4-isopronenyl-1-cyclohexene (MW = 136) | alkylphenol ethoxylate avg. MW = 280, HLB = 4.6 | EP-PO Block copolymer avg. MW = 3800, HLB = 1 |
| 2* | Aliphatic hydrocarbons MW = 128 to 176 | alkylphenol ethoxylate avg. MW = 280, HLB = 4.6 | EO-PO block copolymer avg. MW = 3800, HLB = 1 |
| 3 | Aliphatic hydrocarbons MW = 128 to 176 | rosin acid esters softening point 82° C. | EO-PO block copolymer avg. MW = 5000, HLB = 4 |
| 4 | 1-methyl-4-isopropenyl-1-cyclohexene (MW = 136) | rosin acid esters softening point 82° C. | EO-PO block copolymer avg. MW = 5000, HLB = 4 |
| 5 | polybutene, MW = 350 to 500 | polymethacrylate spec. grav. = 0.90 to 0.92 | — |
| 6 | terpene dimer MW = 270 | polymethacrylate spec. grav. = 0.90 to 0.92 | — |
| 7 | polybutene, MW = 350 to 500 | phenol formaldehyde resin avg. MW = 302 | — |
| 8 | $C_{10}$ alcohol, MW = 158 | phenol formaldehyde resin avg. MW = 302 | — |
| 9 | ethoxylated propoxylated fatty acid | phenol formaldehyde resin avg. MW = 302 | — |
| 10 | terpene dimer MW = 270 | phenol formaldehyde resin resin, avg. MW = 302 | — |
| 11 | polymethacrylate spec. grav. = 0.90 to 0.92 | phenol formaldehyde resin avg. MW = 302 | — |
| 12 | polybutene, MW = 350 to 500 | alkylated vinylpyrrolidone polymer (avg. MW = 8600) | — |
| 13 | phenol formaldehyde resin avg. MW = 302 | alkylated vinylpyrrolidone polymer, avg. MW = 7300 | — |
| 14 | terpene dimer MW = 270 | coconut diethanolamide MW = 204 to 344 | — |
| 15 | alkylphenol ethoxylate avg. MW = 280, HLB 4.6 | EO-PO block copolymer avg. MW = 3800, HLB = 1 | aliphatic hydrocarbons MW = 128 to 176 |
| 16 | alkylphenol ethoxylate avg. MW = 280, HLB = 4.6 | branched alcohol ethoxylate, avg. MW = 332, HLB = 8 | triethylene glycol |
| 17 | mixture of S—I—S and S—B copolymers | aromatic hydrocarbon avg. MW = 92 | — |
| 18 | mixture of S—I—S and S—B copolymers | linear alcohol $C_{12}$–$C_{14}$ ethoxylate, HLB = 6 | aromatic hydrocarbon avg. MW = 92 |
| 19 | mixture of S—I—S and S—B copolymers | linear alcohol $C_{12}$–$C_{14}$ ethoxylate, HLB = 6 | 1-methyl-4-isopropenyl-1-cyclohexene, MW = 136 |
| 20 | mixture of S—I—S and S—B copolymers | alkylphenol ethoxylate avg. MW = 280, HLB = 4.6 | 1-methyl-4-isopropenyl-1-cyclohexene, MW = 136 |
| 21 | mixture of S-I-S and S—B copolymers | linear alcohol $C_{12}$–$C_{16}$ ethoxylate, HLB = 4.4 | 1-methyl-4-isopropenyl-1-cyclohexene, MW = 136 |
| 22 | polyterpene (softening point 115° C.) | linear alcohol $C_{12}$–$C_{14}$ ethoxylate HLB = 6 | 1-methyl-4-isopropenyl-1-cyclohexene, MW = 136 |
| 23 | mixture of S—I—S and S—B copolymers | linear alcohol $C_{12}$–$C_{14}$ ethoxylate HLB = 6 | n-methyl-2-pyrrolidone, NW = 99 |
| 24 | polyterpene (softening point 25° C.) | 1-methyl-4-isopropenyl-1-cyclohexene, NW = 136 | |

*Also contains perfluoroalkyl polymer, MW = 4236
S—I—S is styrene-isoprene-styrene
S–B is styrene-butadiene Laboratory Pulper Agglomeration Test An unbleached kraft paper, cut into 1"×2" pieces was repulped to 5% consistency at 140° F. (~60° C.) and neutral pH for 60 minutes using a Formax Hydrapulper, to make a clean, uncontaminated furnish. The pressure-sensitive adhesive contaminated furnish was prepared using the same procedure, except an adhesive tape (3M packaging tape, model No. 3750-G) was attached to a portion of the unbleached kraft paper. For hot melt and wax contaminants, these were added as solid particles directly to the clean fiber immediately following repulping.

A laboratory pulper was then used to evaluate the agglomeration tendency of stickies using the previously repulped furnish. For the studies involving the pressure-sensitive adhesive, the adhesive contaminated furnish was employed, otherwise the clean furnish was used. The repulped furnish was placed in the laboratory pulper and diluted to 4% consistency at neutral pH. The furnish was heated to the desired temperature and the shear force applied at 1000 rpm. The contaminants, 0.714% wt. based on O.D. fiber, were added to the vortex of the furnish and allowed to mix for approximately one minute. The average size of hot melt and wax contaminants that were added to the pulper was about 200 microns. The furnish containing the test contaminants was then treated with an agglomeration agent at the dosage of 2-20 pounds per ton based on O.D. fiber. After 30 minutes treatment, the furnish was run across a 0.006 inch flat screen to collect the stickies agglomerates. The agglomerates were examined for particle size distribution using a Cue-2 image analyzer.

TABLE II

Particle Size Distribution of Agglomerates for Hot Melt and Pressure-Sensitive Adhesive

| Treatment | Particle Size Distribution of Hot Melt Agglomerates* (microns) | | Particle Size Distribution of Pressure-Sensitive Adhesive Agglomerates* (microns) | |
|---|---|---|---|---|
| | @ 10 #/T | @ 20 #/T | @ 10 #/T | @ 20 #/T |
| Untreated | 434~1570 | | 248~536 | |
| Formulation #1 | 958~3,548 | 1,932~4,028 | 385~1,044 | 627~1,336 |
| Formulation #2 | 970~3,180 | 1,526~3,290 | 484~1,201 | 770~1,540 |
| Formulation #3 | — | 770~1,540 | — | — |
| Formulation #4 | — | 1,134~2,150 | — | — |
| Formulation #5 | 916~3,860 | 862~3,240 | — | 305~525 |
| Formulation #6 | 534~1,486 | 1,106~1,992 | — | 225~370 |
| Formulation #7 | 778~2,658 | 1,322~2,254 | 289~1,029 | 494~1,275 |
| Formulation #8 | 996~3,442 | 1,196~2,178 | 377~546 | 242~803 |
| Formulation #9 | 1,084~3,500 | 576~2,930 | 371~848 | 323~1,087 |
| Formulation #10 | 890~2,610 | 994~2,732 | 351~712 | 237~1,345 |
| Formulation #11 | — | 1,256~2,616 | — | — |
| Formulation #12 | 537~2,483 | 638~1,983 | 357~1,000 | 395~742 |
| Formulation #13 | 656~2,231 | 972~2,552 | 282~803 | 321~593 |
| Formulation #14 | 763~3,099 | 524~2,405 | 385~1,235 | 314~1,458 |
| Formulation #15 | 674~2,784 | 1,864~3,220 | 466~841 | 554~1,110 |
| Formulation #16 | 1,218~3,540 | 1,204~4,062 | 331~897 | 717~1,650 |
| Formulation #17 | 874~2362 | 1056~2649 | 375~754 | 519~962 |
| Formulation #18 | 604~1812 | 1267~2869 | 386~926 | 645~1067 |
| Untreated | 82~187 (@ 110° F.) | | 56~287 (@ 110° F.) | |
| | 94~275 (@ 130° F.) | | 55~336 (@ 130° F.) | |
| Formulation #19 (10 #/T) | 212~434 (@ 110° F.) | | 127~345 (@ 110° F.) | |
| | 200~394 (@ 130° F.) | | 116~337 (@ 130° F.) | |
| Formulation #20 (10 #/T) | 131~413 (@ 130° F.) | | 264~332 (@ 130° F.) | |
| Formulation #21 (10 #/T) | 419~926 (@ 130° F.) | | 329~464 (@ 130° F.) | |
| Formulation #22 (10 #/T) | 305~768 (@ 110° F.) | | 165~407 (@ 110° F.) | |
| Formulation #23 (10 #/T) | 245~546 (@ 110° F.) | | 149~348 (@ 110° F.) | |
| Formulation #24 (10 #/T) | 178~442 (@ 110° F.) | | 163~314 (@ 110° F.) | |

*Test Conditions:
Temp.: 150 F.
pH 7~8
Time: 30 min.
Shear: 1000 rpm

Due to the variable nature of stickies, their melting points, softening points, glass transition temperatures, tackiness and hydrophobicity will differ. As such, the repulping temperature, pH, time, shear force and chemical treatment all have an impact on stickies agglomeration.

As demonstrated in Table II, few noticeable hot melt agglomerates were observed when the temperature was below 140° F. without chemical treatments. Formulations #1 to 18 enhanced the hot melt agglomeration only at the temperatures of 150° F. In general, the particle size distribution of hot melt agglomerates shifted to larger sizes as the dosage of treatment increased from 10 lbs. per ton to 20 lbs. per ton. Formulations 19 to 24 were very effective at agglomerating hot melts even when the temperature was as low as 110° F.

TABLE III

Particle Size Distribution of Agglomerates for Mixed Stickies

| Treatment (10 #/T) | Particle Size Distribution of Hot Melt & Wax Agglomerates Temp. @ 140° F. (microns) | Particle Size Distribution of Pressure-Sensitive Adhesive & Wax Agglomerates Temp. @ 130° F. (microns) |
|---|---|---|
| Untreated | 325~1,005 | 263~590 |
| Formulation #1 | 385~1,771 | 851~1,390 |
| Formulation #2 | 581~1,151 | 723~926 |
| Formulation #5 | 342~1,172 | — |
| Formulation #6 | 571~1,290 | — |
| Formulation #7 | 688~1,153 | 545~1,096 |
| Formulation #8 | 596~1,250 | 674~928 |
| Formulation #9 | 543~1,573 | 646~1,069 |
| Formulation #10 | 538~1,835 | 606~1,048 |
| Formulation #12 | 536~1,111 | 629~982 |
| Formulation #13 | 669~822 | 801~1,082 |
| Formulation #14 | 865~1,292 | 816~1,356 |
| Formulation #15 | 815~1,646 | 848~1,071 |
| Formulation #16 | 487~963 | 629~1,638 |
| Untreated (130° F.) | 180~939 (130° F.) | 60~352 |
| Formulation #19 (130° F.) | 622~1,599 (130° F.) | 248~586 |
| Formulation #20 (130° F.) | 497~1,365 (130° F.) | 314~607 |
| Formulation #21 (130° F.) | 742~1,997 (130° F.) | 372~658 |

As demonstrated in Table III, for formulations 1 to 16, hot melt-wax agglomeration was observed when the mixed stickies were treated at 140° F. or above. The increase in the minimal size of hot melt-wax agglomerates should improve the screen's removal efficiency. At a neutral pH, 130° F. and 10 pounds per ton of treatment, formulations #19 and 20 performed equally well and were more effective than formulations #1 to 16. A similar trend was observed for the pressure-sensitive adhesive-wax agglomeration.

TABLE IV

Particle Size Distribution of Sticky Agglomerates Derived from Hot Melt, Pressure-Sensitive Adhesive and Wax

| Treatment (10 #/T) | Particle Size Distribution Temp. @ 130° F. (microns) | Particle Size Distribution Temp. @ 140° F. (microns) | Particle Size Distribution Temp. @ 150° F. (microns) |
|---|---|---|---|
| Untreated | 255~685 | 312~674 | 375~1,486 |
| Formulation #1 | 647~920 | 639~1,156 | 805~2,907 |
| Formulation #2 | 381~1,005 | 397~1,057 | 654~3,343 |
| Formulation #5 | 457~718 | 470~1,780 | 616~1,840 |
| Formulation #6 | — | 361~811 | 481~2,440 |
| Formulation #7 | 419~803 | 535~918 | 617~1,747 |
| Formulation #8 | — | 369~934 | 516~1,351 |
| Formulation #9 | 708~948 | 557~939 | 402~2,194 |
| Formulation #10 | 631~875 | 388~1,675 | 772~1,845 |
| Formulation #12 | 371~679 | 320~569 | 692~2,673 |
| Formulation #13 | 530~812 | 592~756 | 433~2,263 |
| Formulation #14 | 400~810 | 609~1,123 | 871~2,577 |
| Formulation #15 | 416~959 | 408~1,163 | 812~2,017 |
| Formulation #16 | 297~759 | 601~956 | 454~1,528 |
| Formulation #21 | — | 346~1,504 | — |

Test Conditions:
pH: 7~8
Shear: 1000 rpm
Consistency: 4%
Time: 30 minutes

Table IV demonstrates that mixed stickies of hot melt/pressure-sensitive adhesive/wax can be agglomerated at 130° F. or above when they are treated with agglomeration agents. The average agglomerate size increased with increasing temperature.

TABLE V

Particle Size Distribution of Mixed Stickies Agglomerates When Treated with Formulation #21 at Various Dosages

| Treatment | Particle Size Distribution of Sticky Agglomerates (microns) | | |
|---|---|---|---|
| | Temp. @ 125° F. & pH 11 | Temp. @ 140° F. & pH 7 | Temp. @ 125° F. & pH 11 |
| Untreated | 89~700 | 130~715 | 254~766 |
| Formulation #21 @2 #/T | 317~943 | 230~795 | 350~1,082 |
| Formulation #21 @5 #/T | 259~815 | 268~1,179 | 314~1,164 |
| Formulation #21 @10 #/T | 332~934 | 346~1,504 | 446~1,836 |

As demonstrated in Table V, Formulation #21 proved very effective at agglomerating mixed stickies at pH 11 and a temperature of 125° F. This formulation was even more efficacious at temperatures of 140° F. Stickies agglomeration tendency was enhanced at a higher pH with the treatment.

A laboratory study was conducted to evaluate the efficiency of stickies removal by a flat screen using the chemical agglomeration mechanism. The experimental procedure involved dosing laboratory pulpers with a known quantity of stickies, including hot melt, pressure-sensitive adhesive, and wax, and performing the pulper agglomeration test for control and treated runs. The rejects from screening (0.006 inch slot) were collected, dried, and accurately weighed. The percent rejects level (i.e., % removal) could then be determined.

TABLE VI

Stickies Removal by a Flat Screen with the Chemical Agglomeration Mechanism

| Dosage of Formulation #21 | Temperature (° F.) | pH | % Stickies Removal |
|---|---|---|---|
| 0 lbs/T | 125 | 11 | 67.2 |
| 2 lbs/T | 125 | 11 | 100.0 |
| 5 lbs/T | 125 | 11 | 100.0 |
| 10 lbs/T | 125 | 11 | 100.0 |
| 0 lbs/T | 140 | 7 | 47.4 |
| 2 lbs/T | 140 | 7 | 80.7 |
| 5 lbs/T | 140 | 7 | 100.0 |
| 10 lbs/T | 140 | 7 | 78.0 |
| 0 lbs/T | 140 | 11 | 65.9 |
| 2 lbs/T | 140 | 11 | 100.0 |
| 5 lbs/T | 140 | 11 | 82.7 |
| 10 lbs/T | 140 | 11 | 100.0 |

Note: Stickies consisted of hot melt, pressure-sensitive adhesive, and wax.

As demonstrated on Table VI, due to stickies agglomeration, the percent of stickies removal with the treatment was consistently higher than those of the control runs. Under the tested conditions, an increase of 20 to 30% removal was always obtained. This indicates that with the chemical treatment the stickies can be effectively removed by increasing their sizes with the aid of mechanical separation. By doing this, stickies can be removed from the papermaking system at an early stage, and will not cause problems downstream.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. A method for removing stickies and pitch from papermaking fiber in a pulp and papermaking system comprising the steps of adding to said fiber in the pulper or storage chest a composition comprising at least two of an oil soluble or water-dispersible surfactant having an HLB of about 1 to about 10, a tackifier, and an oil soluble or water-dispersible solvent selected from the group consisting of aliphatic hydrocarbons having molecular weights from about 120 to about 180, a polybutene having a molecular weight of about 350 to about 500, a terpene dimer having a molecular weight of about 270, and an epoxidized soybean oil having a molecular weight of about 1000 wherein said composition will cause the agglomeration of stickies and pitch; and subsequently mechanically separating said agglomerated stickies and pitch from said fiber furnish.

2. The method as claimed in claim 1 wherein said hydrophobic polymer is selected from the group consisting of mixtures of tackified styrene-isoprene-styrene and styrene-butadiene based rubbers, phenol-formaldehyde resins, alkylated vinyl pyrrolidones, polymethacrylates, perfluoroalkyl polymer, and hydroxy terminated 1,3-butadiene homopolymer.

3. The method as claimed in claim 2 wherein said mixtures of tackified styrene-isoprene-styrene and styrene-butadiene based rubbers comprise by weight from about 11 to about 28% styrene-butadiene rubber and from about 11 to about 28% styrene-isoprene-styrene rubber.

4. The method as claimed in claim 3 wherein the weight ratio of said styrene-isoprene-styrene rubber to said styrene-butadiene rubber is less than or equal to 1.

5. The method as claimed in claim 3 wherein said mixtures of tackified styrene-isoprene-styrene and styrene-butadiene further comprise a hydrocarbon and rosin-based resin tackifiers.

6. The method as claimed in claim 2 wherein said phenol-formaldehyde resins have a molecular weight of about 300 to about 1750.

7. The method as claimed in claim 6 wherein said phenol-formaldehyde resins have a molecular weight of about 300.

8. The method as claimed in claim 2 wherein said alkylated vinyl pyrrolidones have a molecular weight of about 7300 to about 8600.

9. The method as claimed in claim 2 wherein said polymethacrylates have a specific gravity of about 0.90 to about 0.92.

10. The method as claimed in claim 2 wherein said perfluoroalkyl polymers have a molecular weight of about 2300 to about 4300.

11. The method as claimed in claim 2 wherein said tackifier is selected from the group consisting of rosin based resins and terpene based resins.

12. The method as claimed in claim 11 wherein said resins have a softening point from about 20° C. to about 120° C.

13. The method as claimed in claim 1 wherein said surfactant is selected from the group consisting of an ethylene oxide-propylene oxide block copolymer, alcohol ethoxylate, ethoxylated propoxylated fatty acid, coconut diethanolamide, and alkyl phenol ethoxylate.

14. The method as claimed in claim 13 wherein said surfactant is selected from the group consisting of an ethylene oxide-propylene oxide block copolymer having an HLB of about 1 and a molecular weight of about 3800, and an HLB of about 4 and a molecular weight of about 5000, a $C_{12}$ to $C_{14}$ alcohol ethoxylate having an HLB of about 6, a $C_{12}$ to $C_{16}$ alcohol ethoxylate having an HLB of about 4.4, a $C_{11}$ to $C_{15}$ secondary alcohol ethoxylate having an HLB of about 8, an ethylene oxide propylene oxide fatty acid having an HLB of about 3 to about 4.5 and a molecular weight of about 1300 to about 1400, a coconut diethanolamide having a molecular weight of about 200 to about 350, and an alkyl phenol ethoxylate having an HLB of about 4.6.

15. The method as claimed in claim 1 wherein said composition is added to said pulper or stock chest in an amount ranging from about 5 parts to about 10,000 parts per million parts O.D. fiber.

16. The method as claimed in claim 1 wherein said pulp and papermaking system has a pH of about 3 to about 12.

17. The method as claimed in claim 1 wherein said pulp and papermaking system is at a temperature of about 50° F. to about 180° F.

18. The method as claimed in claim 1 wherein said mechanical separation is performed with a device selected from the group consisting of primary, secondary, and tertiary screens; forward, reverse, and throughrow cleaners; flotation devices; and centrifugal devices.

19. A stickies and pitch agglomeration composition comprising at least two of an oil soluble or water-dispersible hydrophobic polymer, an oil soluble or water dispersible surfactant having an HLB of about 1 to about 10, a tackifier, and an oil soluble or water-dispersible solvent selected from the group consisting of aliphatic hydrocarbons having molecular weights from about 120 to about 180, a polybutene having a molecular weight of about 350 to about 500, a terpene dimer having a molecular weight of about 270, and an epoxidized soybean oil having a molecular weight of about 1000.

20. The composition as claimed in claim 19 herein said hydrophobic polymer is selected from the group consisting of mixtures of tackified styrene-isoprene-styrene and styrene-butadiene based rubbers, phenol-formaldehyde resins, alkylated vinyl pyrrolidones, polymethacrylates, perfluoroalkyl polymer, and hydroxy terminated 1,3-butadiene homopolymer.

21. The composition as claimed in claim 20 wherein said mixtures of tackified styrene-isoprene-styrene and styrene-butadiene based rubbers comprise by weight from about 11 to about 28% styrene-butadiene rubber and from about 11 to about 28% styrene-isoprene-styrene rubber.

22. The composition as claimed in claim 21 wherein the weight ratio of said styrene-isoprene-styrene rubber to said styrene-butadiene rubber is less than or equal to 1.

23. The composition as claimed in claim 21 wherein said mixtures of tackified styrene-isoprene-styrene and styrene-butadiene further comprise a hydrocarbon and rosin-based resin tackifiers.

24. The composition as claimed in claim 20 wherein said phenol-formaldehyde resins have a molecular weight of about 300 to about 1750.

25. The composition as claimed in claim 24 wherein said phenol-formaldehyde resins have a molecular weight of about 300.

26. The composition as claimed in claim 20 wherein said alkylated vinyl pyrrolidones have a molecular weight of about 7300 to about 8600.

27. The composition as claimed in claim 20 wherein said polymethacrylates have a specific gravity of about 0.90 to about 0.92.

28. The composition as claimed in claim 20 wherein said perfluoroalkyl polymers have a molecular weight of about 2300 to about 4300.

29. The composition as claimed in claim 19 wherein said tackifier is selected from the group consisting of rosin based resins and terpene based resins.

30. The composition as claimed in claim 29 wherein said resins have a softening point from about 20° C. to about 120° C.

31. The composition as claimed in claim 19 wherein said surfactant is selected from the group consisting of an ethylene oxide-propylene oxide block copolymer, alcohol ethoxylate, ethoxylated propoxylated fatty acid, coconut diethanolamide, and alkyl phenol ethoxylate.

32. The composition as claimed in claim 31 wherein said surfactant is selected from the group consisting of an ethylene oxide-propylene oxide block copolymer having an HLB of about 1 and a molecular weight of about 3800, and an HLB of about 4 and a molecular weight of about 5000, a $C_{12}$ to $C_{14}$ alcohol ethoxylate having an HLB of about 6, a $C_{12}$ to $C_{16}$ alcohol ethoxylate having an HLB of about 4.4, a $C_{11}$ to $C_{15}$ secondary alcohol ethoxylate having an HLB of about 8, an ethylene oxide propylene oxide fatty acid having an HLB of about 3 to about 4.5 and a molecular weight of about 1300 to about 1400, a coconut diethanolamide having a molecular weight of about 200 to about 350, and an alkyl phenol ethoxylate having an HLB of about 4.6.

* * * * *

UNITED STATES PATENT AND TRADEMARK OFFICE
CERTIFICATE OF CORRECTION

PATENT NO. : 5,936,024      Page 1 of 1
DATED : August 10, 1999
INVENTOR(S) : T. Ling et al.

It is certified that error appears in the above-identified patent and that said Letters Patent is hereby corrected as shown below:

Column 10,
Line 7, after "of" insert --- an oil-soluble or water-dispersible, hydrophobic polymer, ---.
Line 15, after "1000" insert --- , ---.

Column 11,
Line 34, change "herein" to --- wherein ---

Signed and Sealed this

Seventh Day of August, 2001

Attest:

NICHOLAS P. GODICI
Attesting Officer     Acting Director of the United States Patent and Trademark Office